(12) United States Patent
Liu

(10) Patent No.: US 9,751,585 B1
(45) Date of Patent: Sep. 5, 2017

(54) FRAME STRUCTURE OF BABY TRAILER

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 0 days.

(21) Appl. No.: 15/371,389

(22) Filed: Dec. 7, 2016

(51) Int. Cl.
B62K 27/02 (2006.01)
B62K 27/00 (2006.01)
B62K 27/12 (2006.01)

(52) U.S. Cl.
CPC ............ *B62K 27/003* (2013.01); *B62K 27/02* (2013.01); *B62K 27/12* (2013.01)

(58) Field of Classification Search
CPC ...... B62K 27/003; B62K 27/10; B62K 27/02; B62K 27/12; B62B 1/12; B62B 1/125; B62B 3/007; B62B 3/02; B62B 9/12; B62D 63/061; B62D 21/14
USPC ........................................ 280/656, 651, 657
See application file for complete search history.

(56) References Cited

U.S. PATENT DOCUMENTS

| | | | | |
|---|---|---|---|---|
| 5,687,980 A * | 11/1997 | Eckroth | ................. | B62K 27/12 280/204 |
| 5,984,332 A * | 11/1999 | Beaudoin | ............. | B62K 15/006 280/204 |
| 7,341,265 B1 * | 3/2008 | Liu | ........................ | B62K 27/12 280/204 |
| 7,354,058 B2 * | 4/2008 | Chou | ................... | B62D 63/061 280/651 |
| 2002/0074764 A1 * | 6/2002 | Allen | .................... | B62K 27/003 280/204 |
| 2007/0284842 A1 * | 12/2007 | O'Donnell | ........... | B62K 27/003 280/204 |

* cited by examiner

Primary Examiner — John Walters
(74) Attorney, Agent, or Firm — Jackson IPG PLLC; Demian K. Jackson

(57) ABSTRACT

A frame structure of baby trailer includes a bottom frame including a front frame bar, a rear frame bar, and opposing left and right frame bars respectively pivotally connected between the front and rear frame bars, two ⊓-shaped upright support frame bars respectively connected with respective front and rear ends thereof to the bottom frame, and a top transverse frame bar connected between the two upright support frame bars at a top side. The front or rear frame bar of the bottom frame is retractable and can be set between an extended position and a received position and locked in the extended position by a locking device so that the bottom frame can be conveniently and rapidly collapsed through a unilateral operation to reduce the dimension.

2 Claims, 16 Drawing Sheets

FRAME STRUCTURE OF BABY TRAILER

BACKGROUND AND SUMMARY OF THE INVENTION

The present invention relates to a baby trailer and more specifically, to a frame structure of baby trailer, which facilitates setting the bottom frame between an extended position and a received position.

U.S. Pat. Nos. 8,444,173 and 7,341,265 disclose a baby trailer that allows adjustment of the front bar and rear bar of the bottom frame between an extended position and a received position. However, when collapsing the front bar and the rear bar, the user needs to unfasten the fastening member at the front bar and the fastening member at the rear bar. On the contrary, when extending out the bottom frame, the user needs to extend out the front bar and the rear bar, and then to fasten up the fastening member at the front bar and the fastening member at the rear bar. This operation procedure is inconvenient, wasting much labor and time.

The present invention has been accomplished under the circumstances in view. It is therefore the main object of the present invention to provide a frame structure of baby trailer, which can be conveniently and rapidly collapsed through a unilateral operation to reduce the dimension, facilitating package, delivery and storage.

To achieve these and other objects of the present invention, a frame structure of baby trailer comprises a bottom frame that comprises a front frame bar, a rear frame bar and opposing left and right frame bars respectively pivotally connected between the front and rear frame bars, two ⊓-shaped upright support frame bars respectively connected with respective front and rear ends thereof to the bottom frame, and a top transverse frame bar connected between the two upright support frame bars at a top side. The front or rear frame bar of the bottom frame is retractable, and can be set between an extended position and a received position and then locked in the extended position by fastening means.

DETAILED DESCRIPTION OF THE INVENTION

Figure 1:
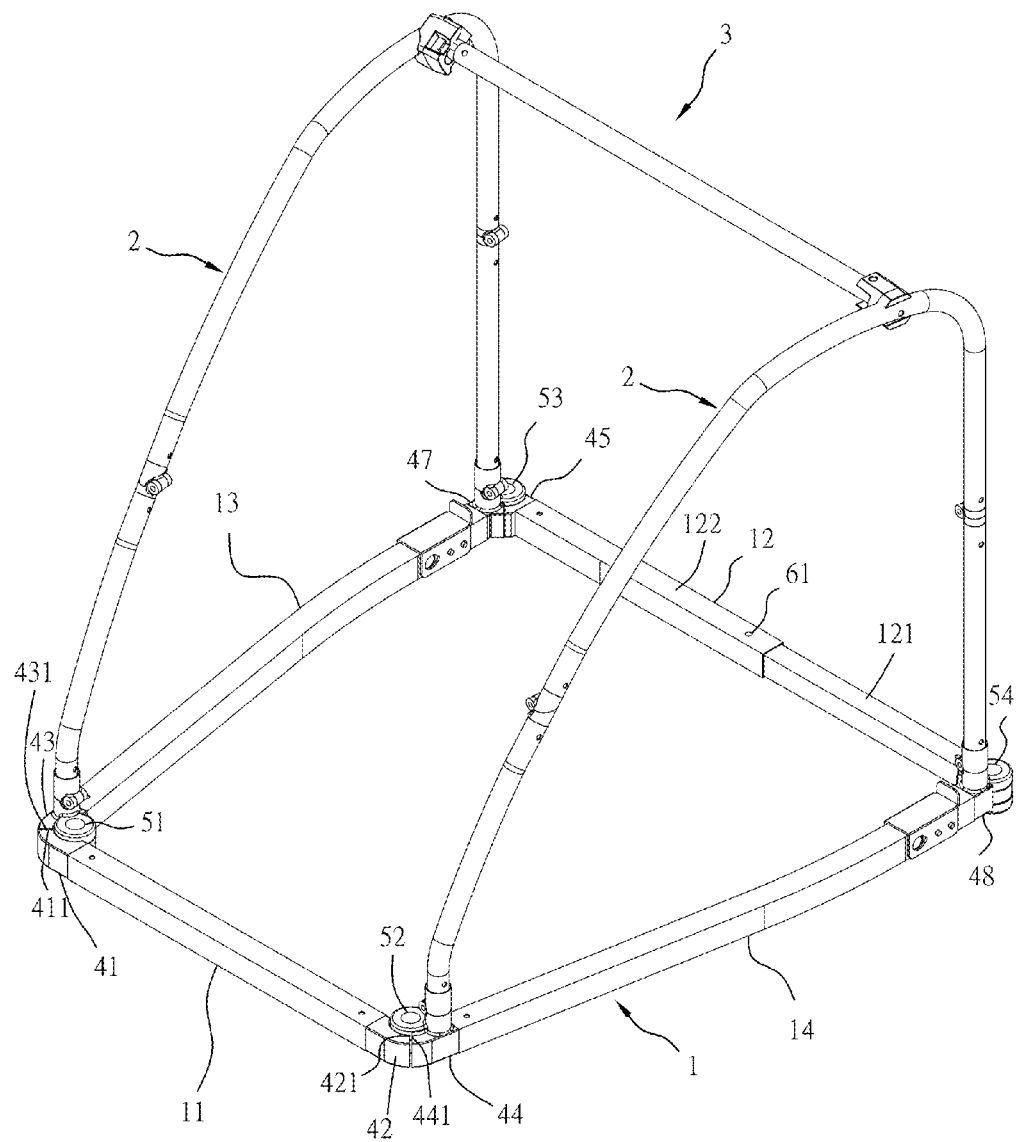
FIG. 1 is an elevational view of a frame structure of baby trailer in accordance with a first embodiment of the present invention.
Figure 2:
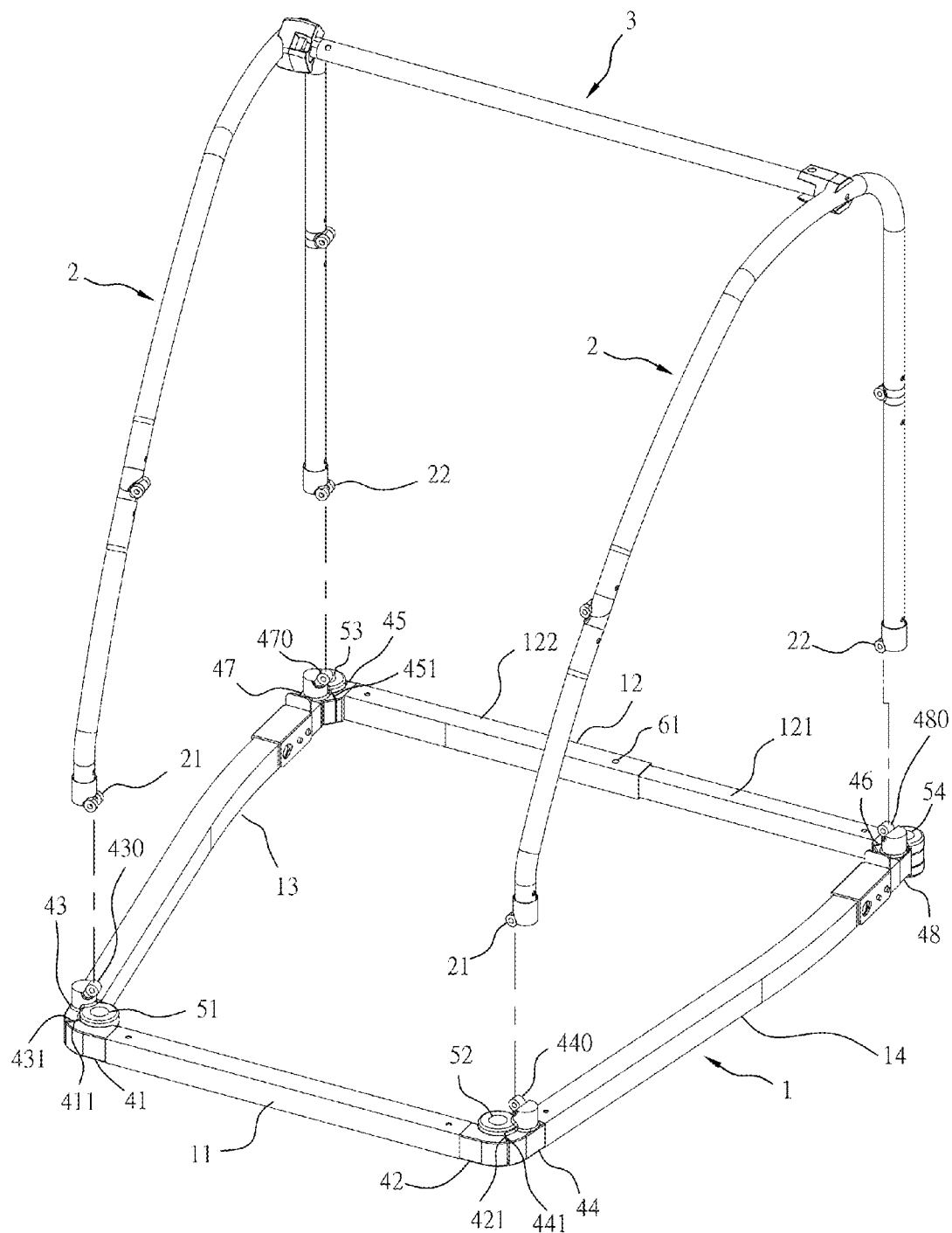
FIG. 2 is an exploded view of the frame structure of baby trailer in accordance with the first embodiment of the present invention.
Figure 3:
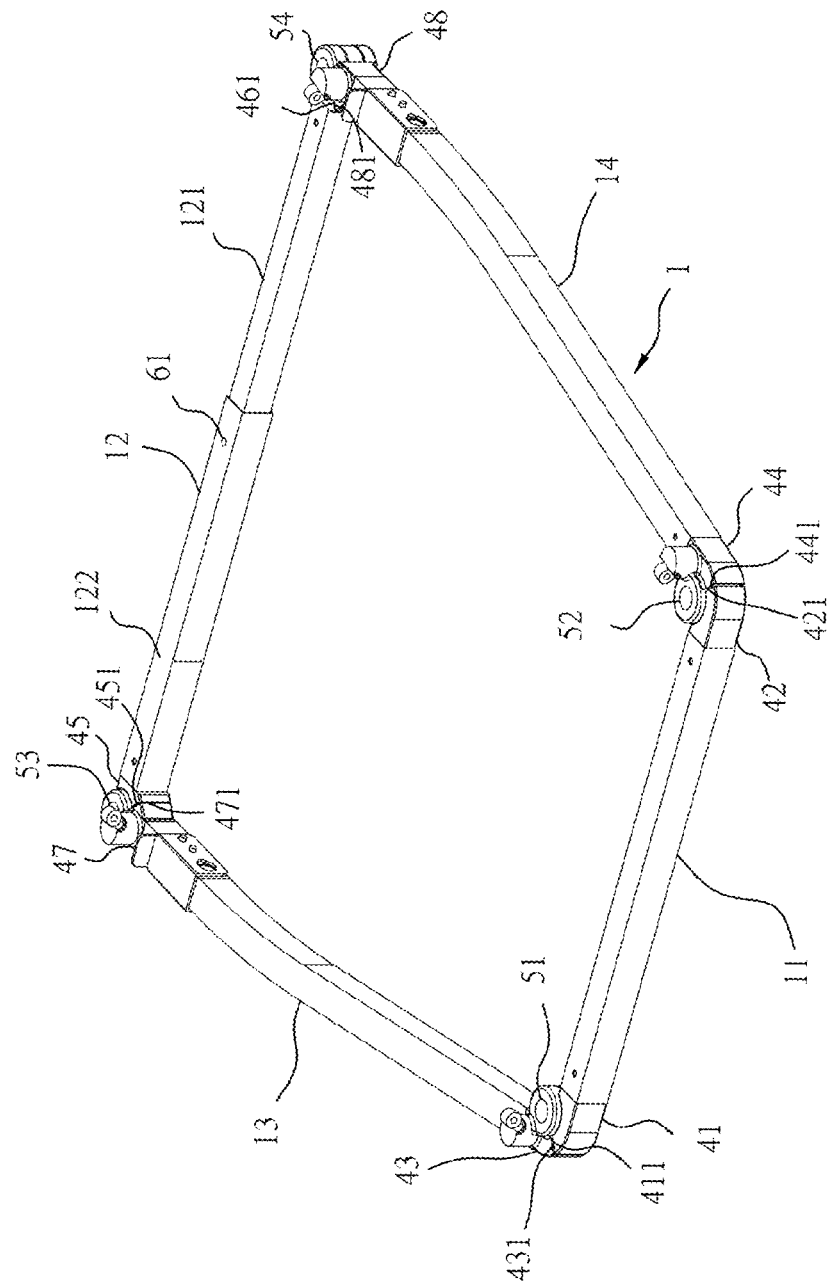
FIG. 3 is an elevational view of the bottom frame of the frame structure of baby trailer in accordance with the first embodiment of the present invention.
Figure 4:
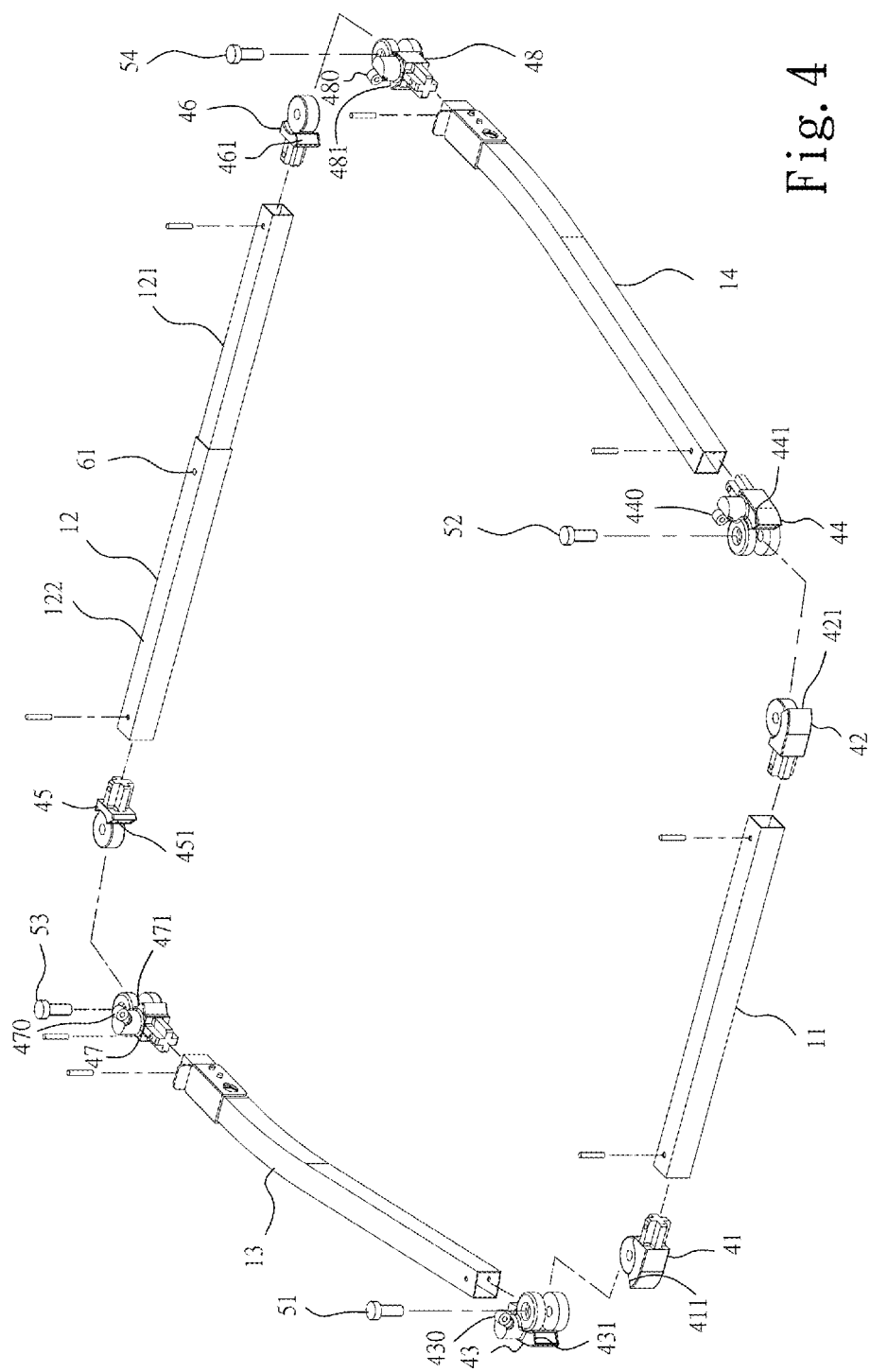
FIG. 4 is an exploded view of the bottom frame of the frame structure of baby trailer in accordance with the first embodiment of the present invention.
Figure 5:
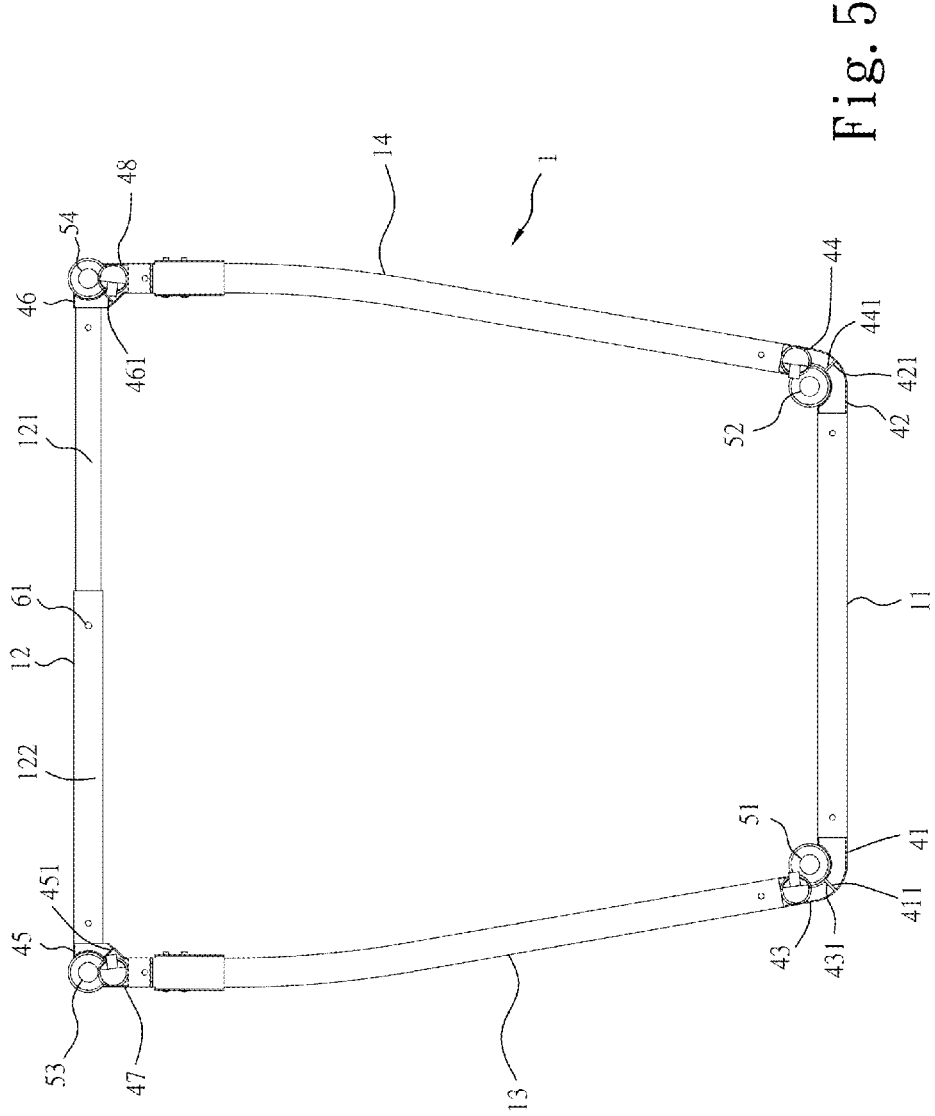
FIG. 5 is a top plain view of the bottom frame of the frame structure of baby trailer in the extended position in accordance with the first embodiment of the present invention.
Figure 6:
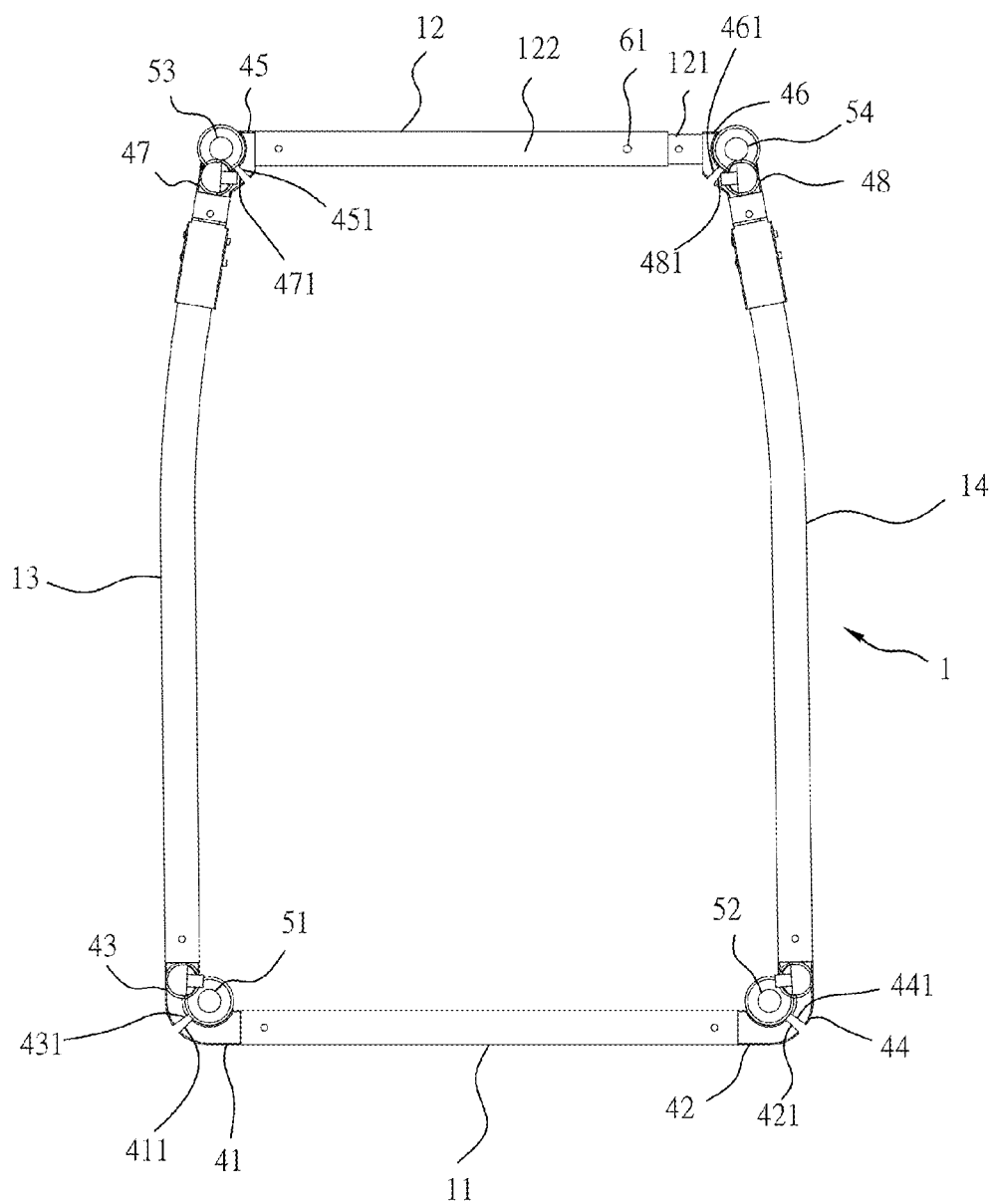
FIG. 6 is a top plain view of the bottom frame of the frame structure of baby trailer in the received position in accordance with the first embodiment of the present invention.
Figure 7:
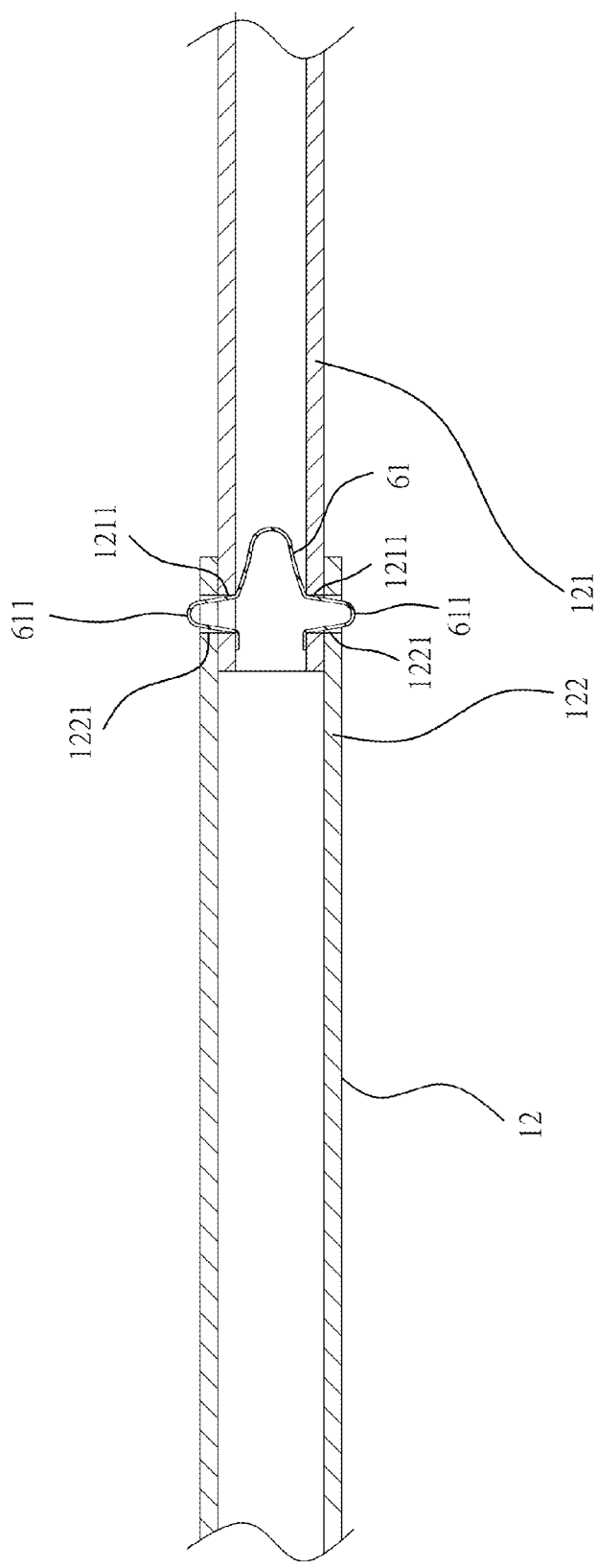
FIG. 7 is a sectional view, in an enlarged scale, of a part of the first embodiment of the present invention, illustrating a double-ended spring plunger of the fastening means fastened to the inner frame tube and outer frame tube of the rear frame bar of the bottom frame.

Referring to FIGS. 1-7, a frame structure of baby trailer in accordance with a first embodiment of the present invention is shown. The frame structure of baby trailer (see FIGS. 1 and 2) comprises:

a bottom frame 1 comprising a front frame bar 11, a rear frame bar 12 opposite to the front frame bar 11, and opposing left and right frame bars 13,14 respectively connected between the front frame bar 11 and the rear frame bar 12;

two ⊓-shaped upright support frame bars 2 respectively connected with respective front and rear ends thereof to the bottom frame 1; and a top transverse frame bar 3 connected between the two upright support frame bars 2 at a top side.

The frame structure of baby trailer is characterized by the features described hereinafter.

Figure 8:
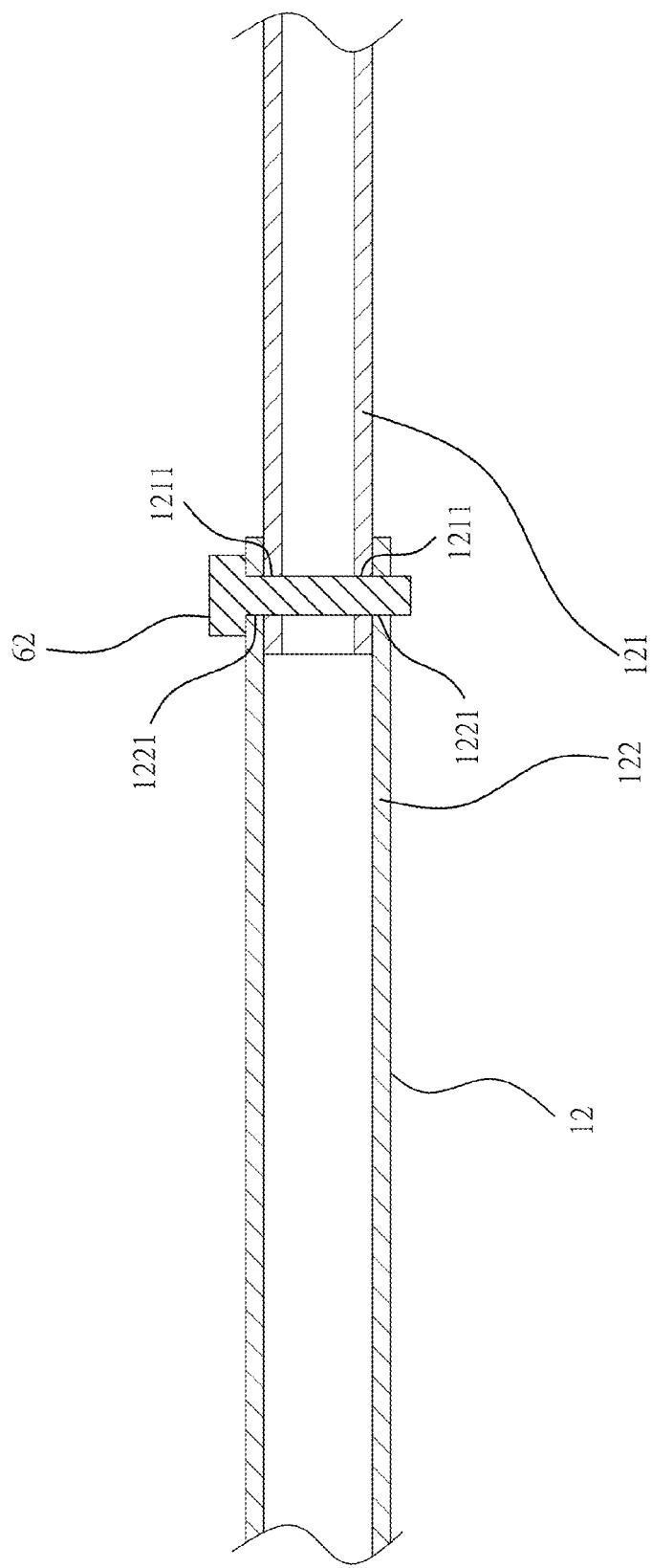
FIG. 8 is a sectional view, in an enlarged scale, of a part of the first embodiment of the present invention, illustrating a lock pin of the fastening means fastened to the inner frame tube and outer frame tube of the rear frame bar of the bottom frame.
Figure 9:
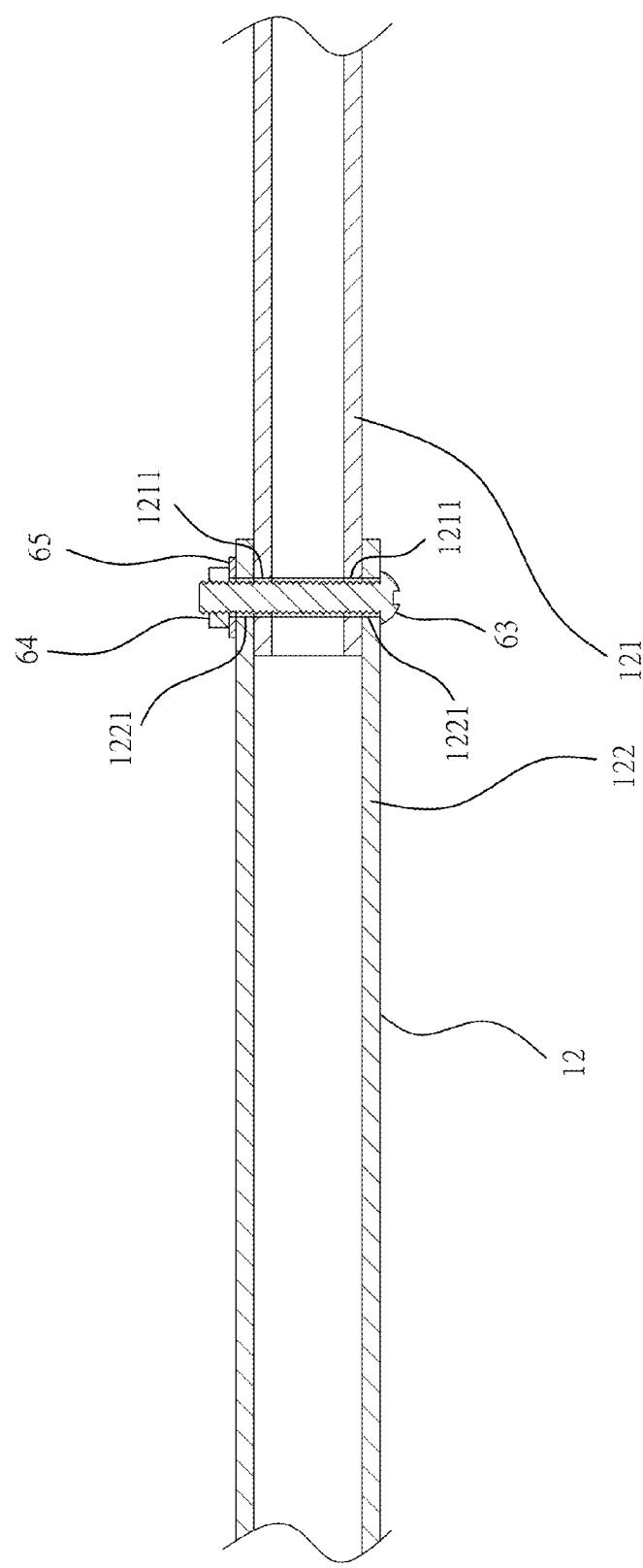
FIG. 9 is a sectional view, in an enlarged scale, of a part of the first embodiment of the present invention, illustrating a screw, screw nut and washer set of the fastening means fastened to the inner frame tube and outer frame tube of the rear frame bar of the bottom frame.

The bottom frame 1 further comprises a first connector 41 and a second connector 42 respectively located at two opposite ends of the front frame bar 11 (see FIGS. 3-6), a third connector 43 and a fourth connector 44 respectively located at a front end of the left frame bar 13 and a front end of the right frame bar 14, a first pivot member 51 pivotally connecting the first connector 41 to the third connector 43, and a second pivot member 52 pivotally connecting the second connector 42 to the fourth connector 44. The first connector 41 comprises a stop flange 411. The second connector 42 comprises a stop flange 421 (see FIG. 6). The third connector 43 comprises an abutment flange 431 for abutment against the stop flange 411 of the first connector 41 to limit the pivoting angle of the left frame bar 13. The fourth connector 44 comprises an abutment flange 441 for abutment against the stop flange 421 of the second connector 42 to limit the pivoting angle of the right frame bar 14. The rear frame bar 12 of the bottom frame 1 is a retractable frame bar consisting of an inner frame tube 121 and an outer frame tube 122. The inner frame tube 121 has one end thereof slidably inserted into the outer frame tube 122 and providing a locating hole 1211 (see FIG. 7). The outer frame tube 122 has a locating hole 1221 located at one end thereof detachably fastened to the locating hole 1211 of the inner frame tube 121 by fastening means, for example, double-ended spring plunger 61 (see FIG. 7), lock pin 62 (see FIG. 8), or screw 63, screw nut 64 and washer 65 set (see FIG. 9). The bottom frame 1 further comprises a fifth connector 45 and a sixth connector 46 respectively located at one end of the outer frame tube 122 of the rear frame bar 12 and an opposite end of the inner frame tube 121 of the rear frame bar 12 (see FIGS. 3-6), a seventh connector 47 and an eighth connector 48 respectively located at an opposing rear end of the left frame bar 13 and an opposing rear end of the right frame bar 14, a third pivot member 53 pivotally connecting the fifth connector 45 to the seventh connector 47, and a fourth pivot member 54 pivotally connecting the sixth connector 46 to the eighth connector 48. Further, the fifth connector 45 comprises a stop flange 451. The sixth connector 46 comprises a stop flange 461. The seventh connector 47 comprises an abutment flange 471 for abutment against the stop flange 451 of the fifth connector 45 to limit the pivoting angle of the left frame bar 13. The eighth connector 48 comprises an abutment flange 481 for abutment against the stop flange 461 of the sixth connector 46 to limit the pivoting angle of the right frame bar 14.

Thus, when collapsing the bottom frame 1, unfasten the fastening means such as double-ended spring plunger 61 (see FIG. 7), lock pin 62 (see FIG. 8), or screw 63, screw nut 64 and washer 65 set (see FIG. 9), to unlock the inner frame tube 121 and outer frame tube 122 of the rear frame bar 12, and then push the inner frame tube 121 into the inside of the outer frame tube 122 to shorten the length of the rear frame bar 12. At this time, the fifth connector 45 at the outer frame tube 122 and the sixth connector 46 at the inner frame tube 121 are driven to move the seventh connector 47 and the eighth connector 48 respectively, biasing the left and right frame bars 13,14 inwardly toward each other relative to the front frame bar 11 (see FIG. 6), and thus, the overall dimension of the bottom frame 1 is reduced, facilitating package, delivery or storage. Thus, simply unfastening the fastening means at the rear frame bar 12 can collapse the bottom frame 1. When wishing to extend out the bottom frame 1, pull the inner frame tube 121 of the rear frame bar 12 out of the outer frame tube 122 and fasten up the fastening means to lock the rear frame bar 12 in the extended position. When pulling the inner frame tube 121 of the rear frame bar 12 out of the outer frame tube 122, the fifth and sixth connectors 45,46 are driven to move the seventh and eighth connectors 47,48 respectively, thereby forcing the left and right frame bars 13,14 to bias outwardly away from each other relative to the front frame bar 11 to the extent where the abutment flanges 431,441 of the third and fourth connectors 43,44 are respectively abutted against the stop flanges 411,412 of the first and second connectors 41,42 and, the abutment flanges 471,481 of the seventh and eighth connectors 47,48 are respectively abutted against the stop flanges 451,461 of the fifth and sixth connectors 45,46. At this time, fasten up the fastening means such as double-ended spring plunger 61, lock pin 62, or screw 63, screw nut 64 and washer 65 set to lock the inner frame tube 121 and outer frame tube 122 of the rear frame bar 12 in the extended position. Thus, the bottom frame 1 is positively locked in the extended position (see FIG. 5).

Further, in the case that the fastening means for locking the inner frame tube 121 and outer frame tube 122 of the rear frame bar 12 is a double-ended spring plunger 61 that is mounted at the inner frame tube 121, when unlocking the fastening means, press the pin 1 of the double-ended spring plunger 61 inwardly away from the locating hole 1221 of the outer frame tube 122 of the rear frame bar 12 (see FIG. 7); in the case that the fastening means for locking the inner frame tube 121 and outer frame tube 122 of the rear frame bar 12 is a lock pin 62 (see FIG. 8), directly pull the lock pin 62 out of the rear frame bar 12; in the case that the fastening means for locking the inner frame tube 121 and outer frame tube 122 of the rear frame bar 12 is a set of screw 63, screw nut 64 and washer 65 (see FIG. 9) or a set of, detach the screw 63, screw nut 64 and washer 65 set to unlock the rear frame bar 12. On the contrary, when wishing to fasten up the fastening means to lock the inner frame tube 121 and outer frame tube 122 of the rear frame bar 12 in the extended position, in the case that the fastening means for locking the inner frame tube 121 and outer frame tube 122 of the rear frame bar 12 is a double-ended spring plunger 61, directly pull the inner frame tube 121 out of the outer frame tube 122 to the extent for allowing the lock pin 611 of the double-ended spring plunger 61 to be forced by the elastic restoring energy of the double-ended spring plunger 61 to engage into the locating hole 1221 of the outer frame tube 122; in the case that the fastening means for locking the inner frame tube 121 and outer frame tube 122 of the rear frame bar 12 is a lock pin 62, directly plug the lock pin 62 into the locating hole 1221 of the outer frame tube 122 and the locating hole 1211 of the inner frame tube 121; in the case that the fastening means for locking the inner frame tube 121 and outer frame tube 122 of the rear frame bar 12 is a screw 63 or a set of screw nut 64 and washer 65, insert the screw 63 into the locating hole 1221 of the outer frame tube 122 and the locating hole 1211 of the inner frame tube 121, and then fasten the screw nut 64 and the washer 65 onto the screw 63.

Referring to FIG. 2 again, the front and rear ends 21,22 of the upright support frame bars 2 are respectively connected to respective top connection portions 430,440 of the third and fourth connectors 43,44 and respective top connection portions 470,480 of the seventh and eighth connectors 47,48 at the respective front and rear ends of the left and right frame bars 13,14 of the bottom frame 1. Alternatively, the front and rear ends 21,22 of the upright support frame bars 2 can be directly fastened to the left and right frame bars 13,14, or by means of other connection means.

Figure 10:
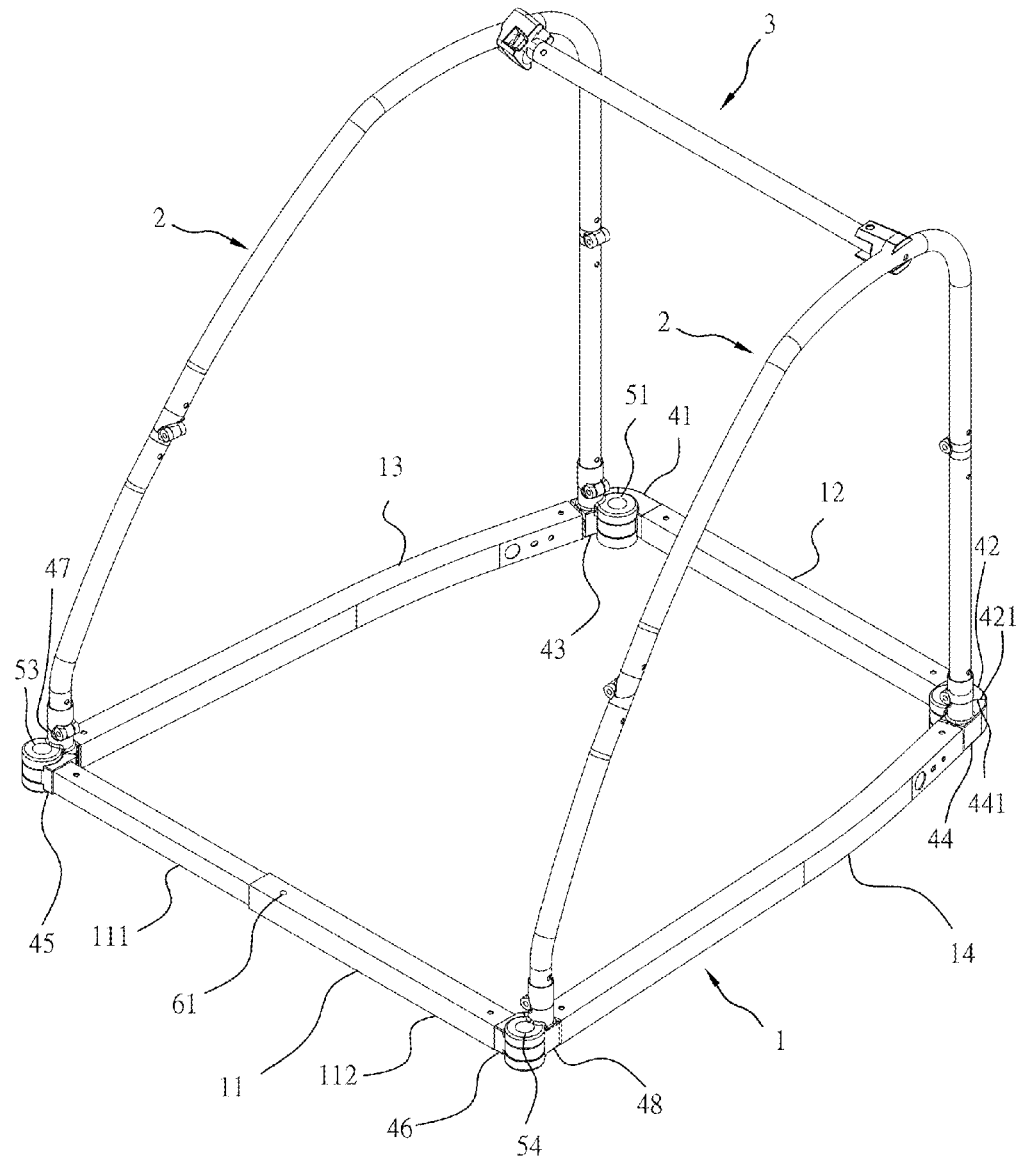
FIG. 10 is an elevational view of a frame structure of baby trailer in accordance with a second embodiment of the present invention.
Figure 11:
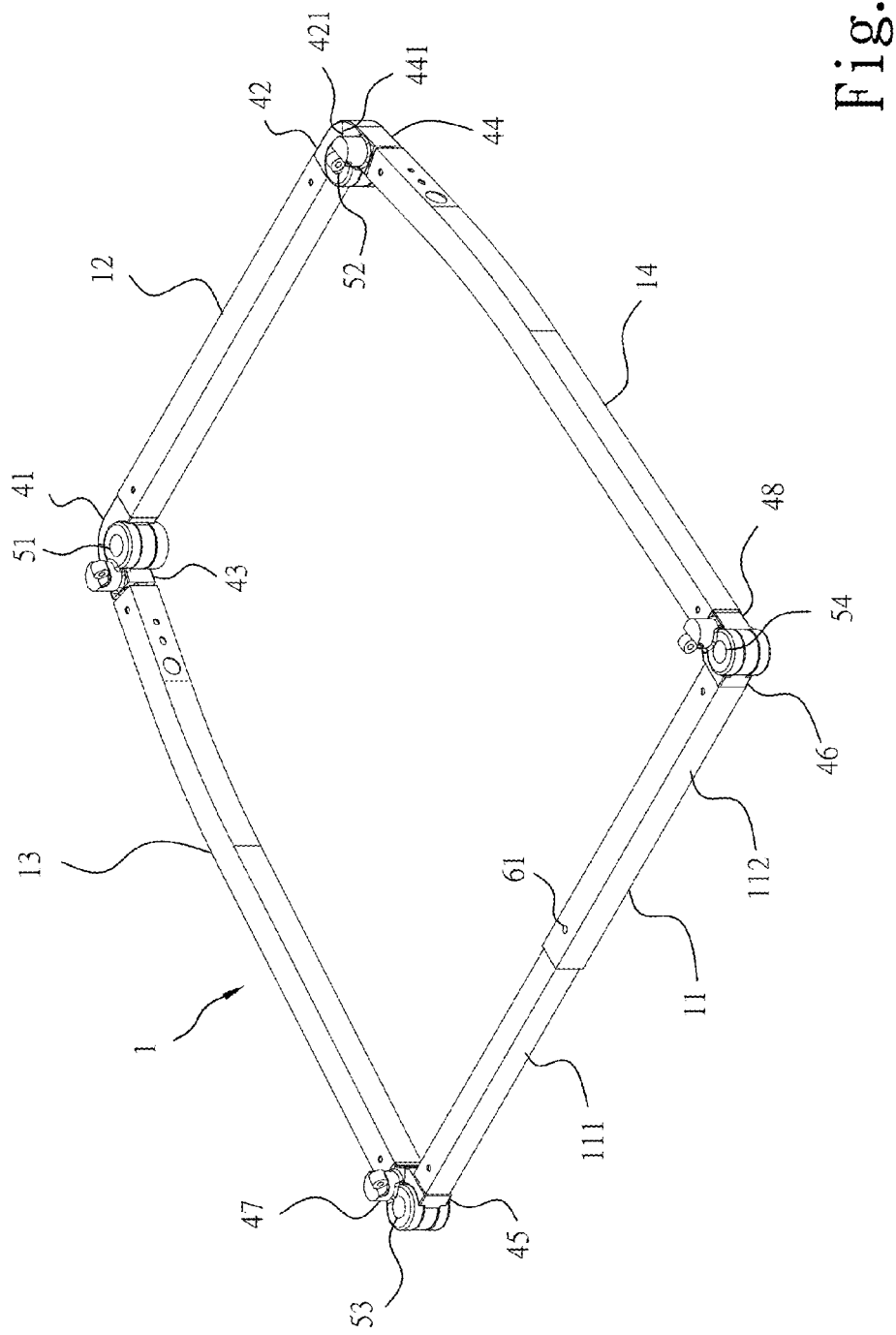
FIG. 11 is an elevational view of the bottom frame of the frame structure of baby trailer in accordance with the second embodiment of the present invention.
Figure 12:
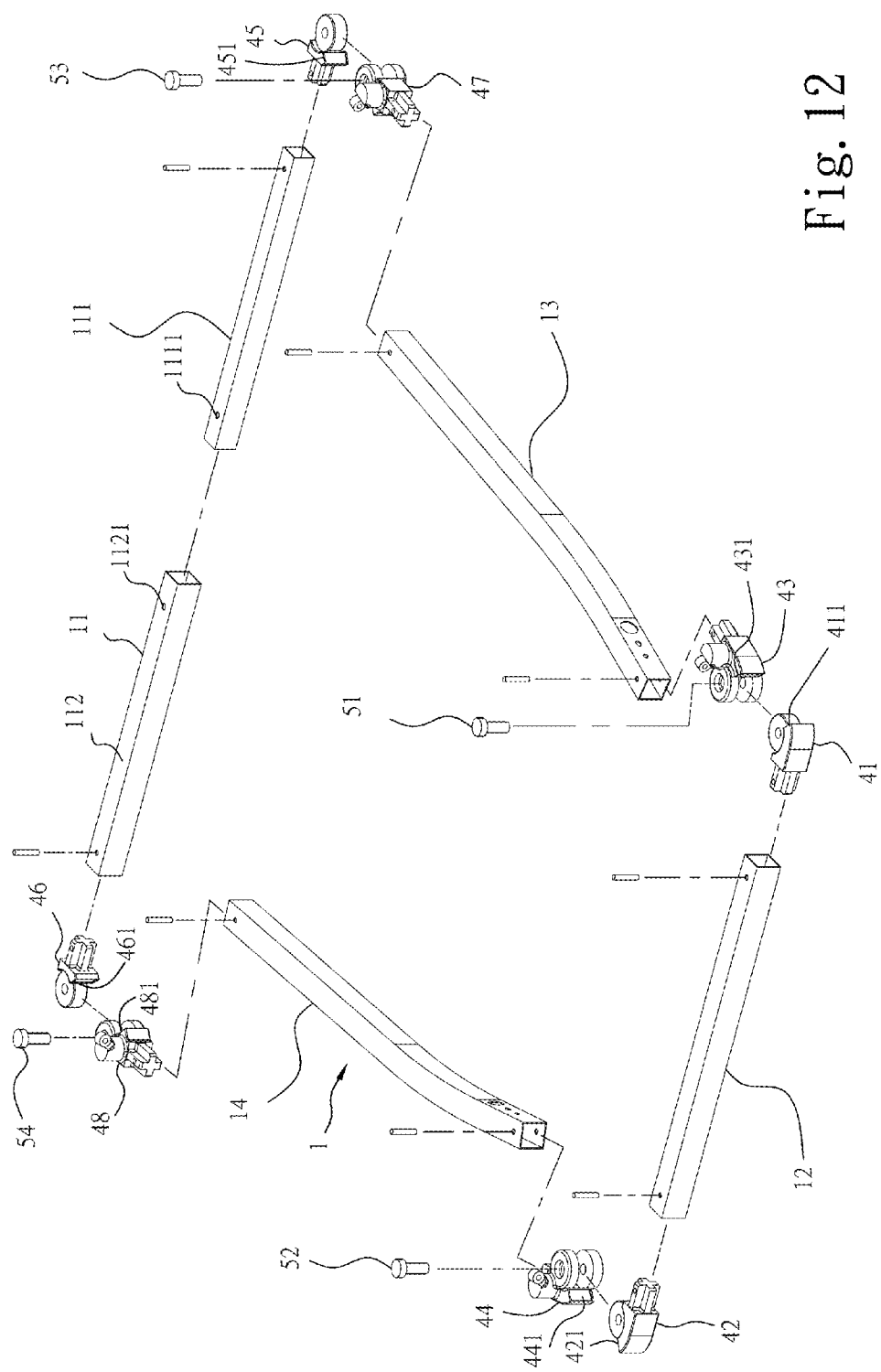
FIG. 12 is an exploded view of the bottom frame of the frame structure of baby trailer in accordance with the second embodiment of the present invention (the fastening means excluded).
Figure 13:
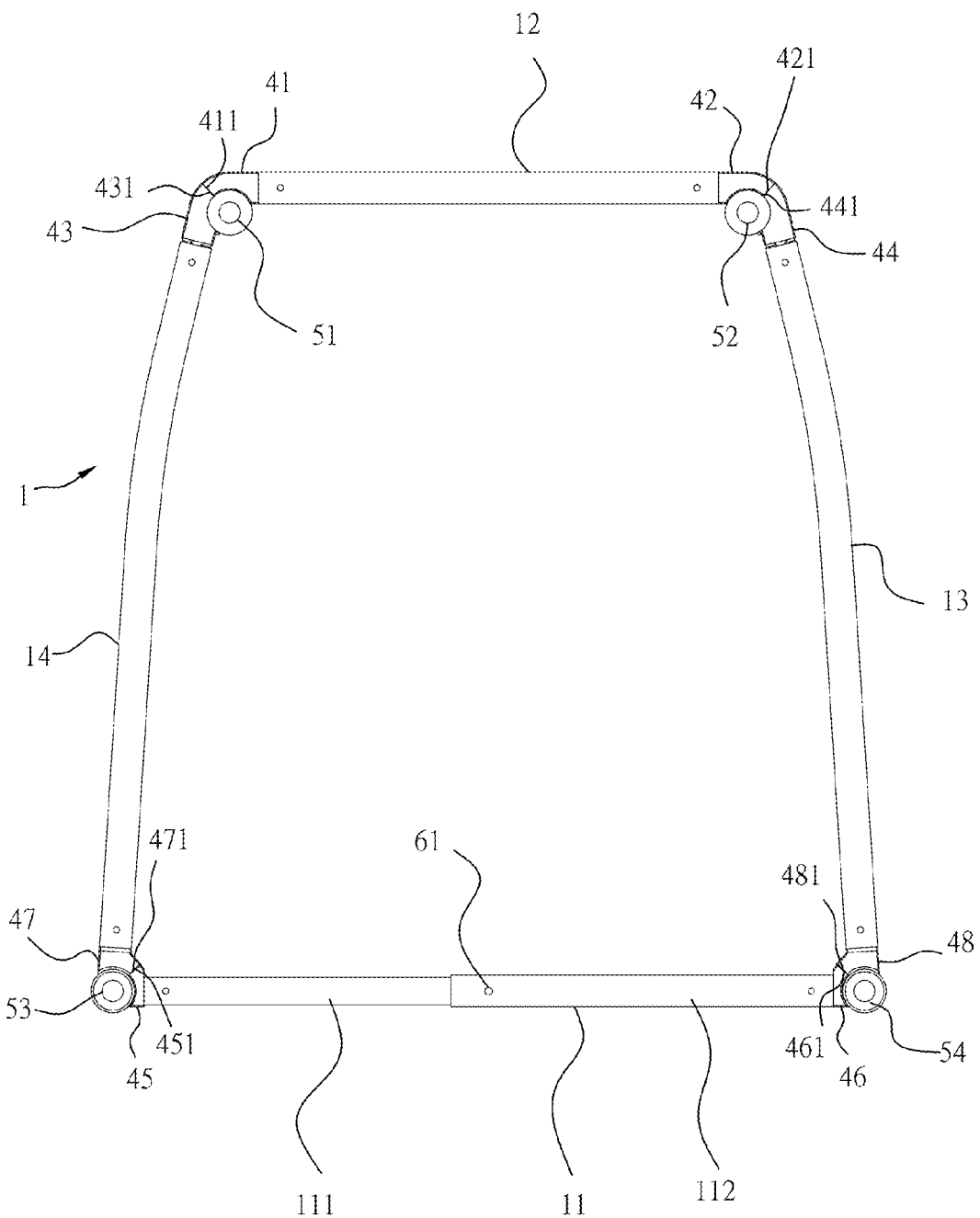
FIG. 13 is a top plain view of the bottom frame of the frame structure of baby trailer in the extended position in accordance with the second embodiment of the present invention.

Referring to FIGS. 10-13, a frame structure of baby trailer in accordance with a second embodiment of the present invention is shown. The frame structure of baby trailer comprises:

a bottom frame 1 comprising a front frame bar 11, a rear frame bar 12 opposite to the front frame bar 11, and opposing left and right frame bars 13,14 respectively connected between the front frame bar 11 and the rear frame bar 12;

two ⊓-shaped upright support frame bars 2 respectively connected with respective front and rear ends thereof to the bottom frame 1 (see FIG. 10); and a top transverse frame bar 3 connected between the two upright support frame bars 2 at a top side (see FIG. 10).

The frame structure of baby trailer is characterized by the features described hereinafter.

Figure 14:
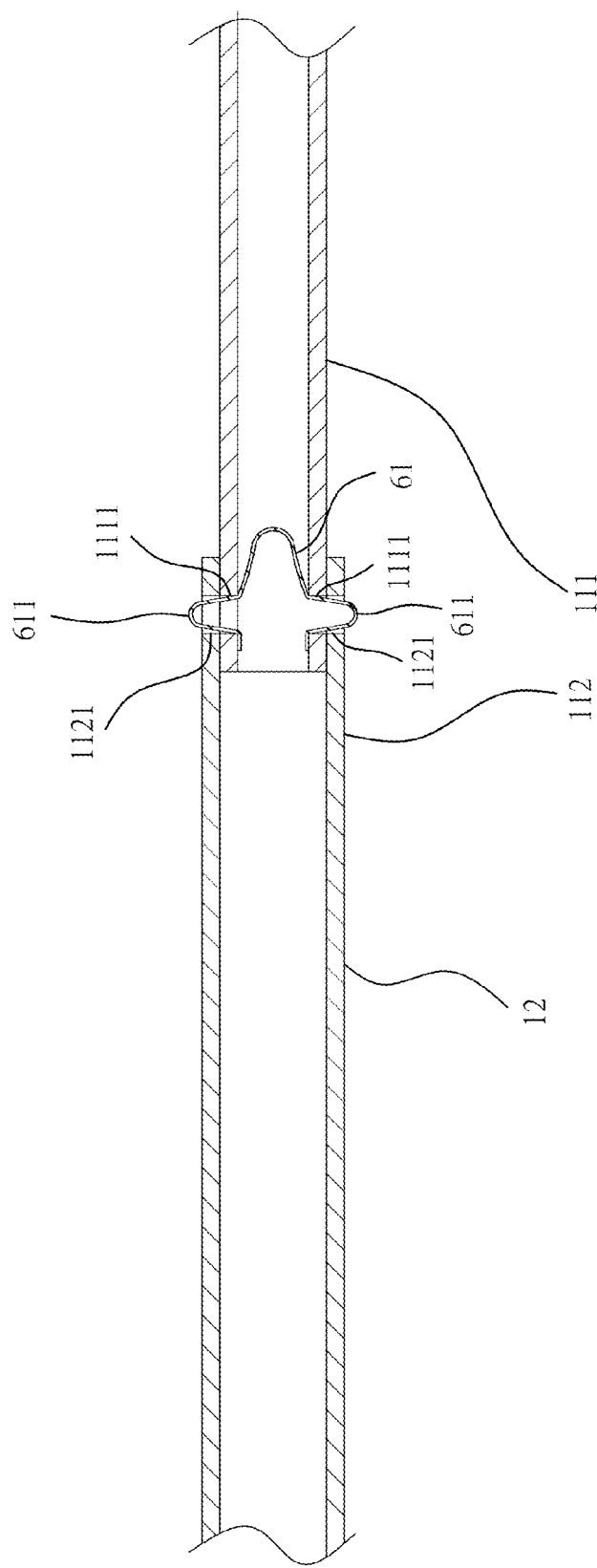
FIG. 14 is a sectional view, in an enlarged scale, of a part of the second embodiment of the present invention, illustrating a double-ended spring plunger of the fastening means fastened to the inner frame tube and outer frame tube of the rear frame bar of the bottom frame.
Figure 15:
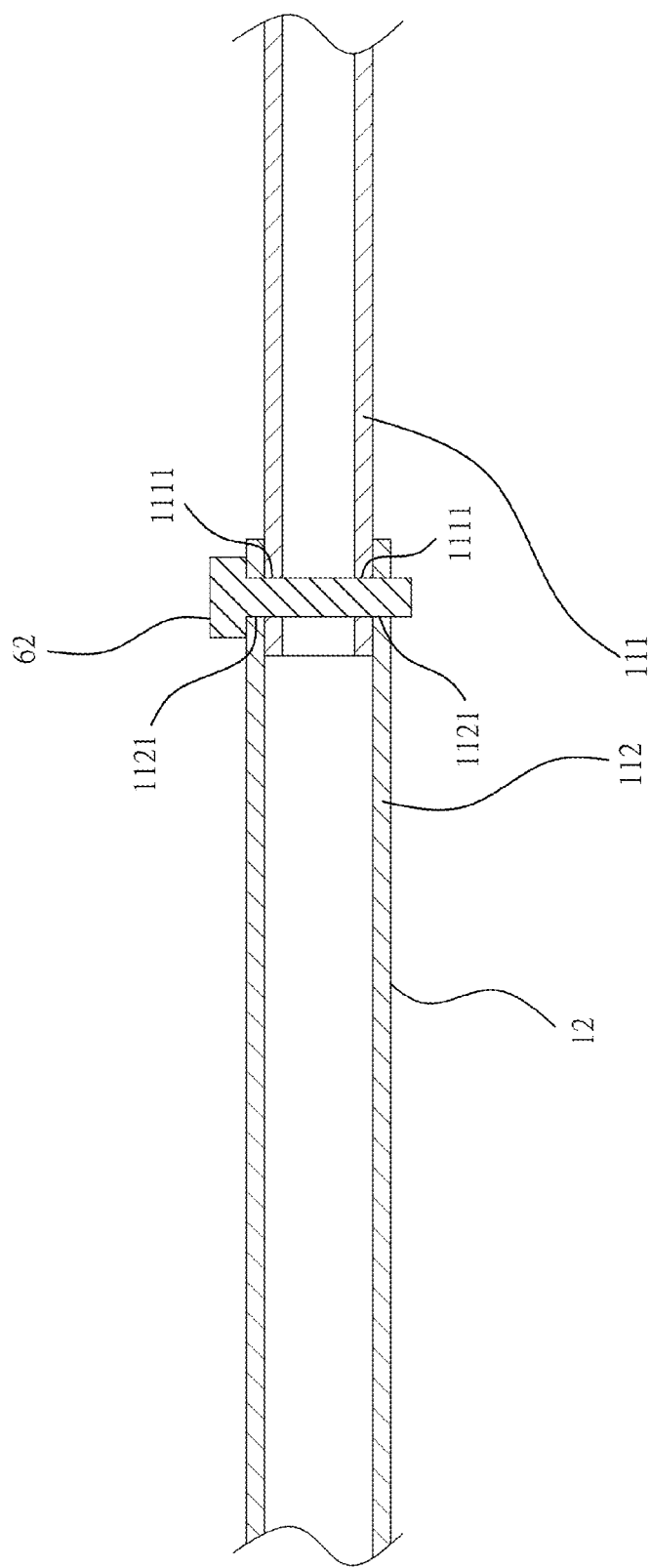
FIG. 15 is a sectional view, in an enlarged scale, of a part of the second embodiment of the present invention, illustrating a lock pin of the fastening means fastened to the inner frame tube and outer frame tube of the rear frame bar of the bottom frame.
Figure 16:
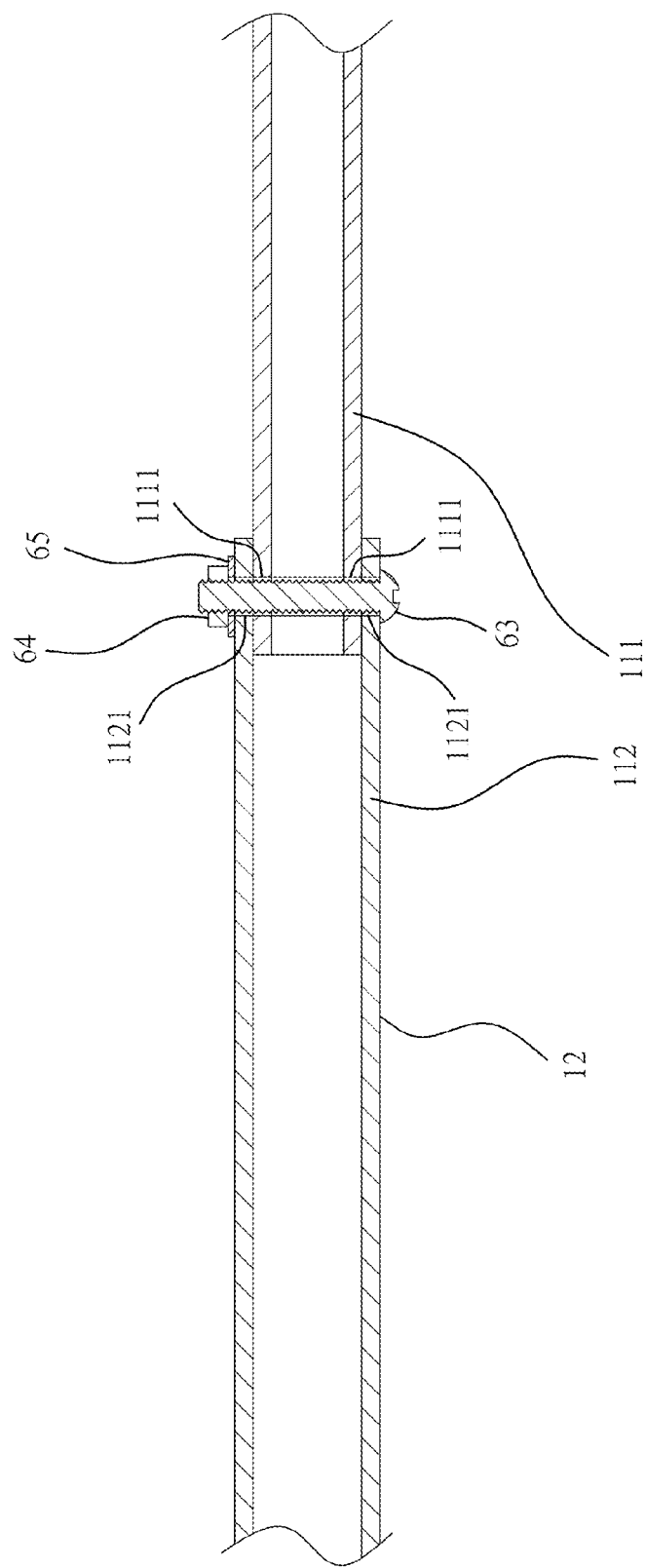
FIG. 16 is a sectional view, in an enlarged scale, of a part of the second embodiment of the present invention, illustrating a screw, screw nut and washer set of the fastening means fastened to the inner frame tube and outer frame tube of the rear frame bar of the bottom frame.

The bottom frame 1 further comprises a first connector 41 and a second connector 42 respectively located at two opposite ends of the front frame bar 11 (see FIG. 12), a third connector 43 and a fourth connector 44 respectively located at a front end of the left frame bar 13 and a front end of the right frame bar 14, a first pivot member 51 pivotally connecting the first connector 41 to the third connector 43, and a second pivot member 52 pivotally connecting the second connector 42 to the fourth connector 44. The first connector 41 comprises a stop flange 411. The second connector 42 comprises a stop flange 421 (see FIG. 13). The third connector 43 comprises an abutment flange 431 for abutment against the stop flange 411 of the first connector 41 to limit the pivoting angle of the left frame bar 13. The fourth connector 44 comprises an abutment flange 441 for abutment against the stop flange 421 of the second connector 42 to limit the pivoting angle of the right frame bar 14. The front frame bar 11 of the bottom frame 1 is a retractable frame bar consisting of an inner frame tube 111 and an outer frame tube 2. The inner frame tube 111 has one end thereof slidably inserted into the outer frame tube 112 and providing a locating hole 1111 (see FIG. 14). The outer frame tube 112 has a locating hole 1121 located at one end thereof detachably fastened to the locating hole 1111 of the inner frame tube 111 by fastening means, for example, double-ended spring plunger 61 (see FIG. 14), lock pin 62 (see FIG. 15), or screw 63, screw nut 64 and washer 65 set (see FIG. 16). The bottom frame 1 further comprises a fifth connector 45 and a sixth connector 46 respectively located at one end of the outer frame tube 112 of the front frame bar 11 and an opposite end of the inner frame tube 111 of the front frame bar 11, a seventh connector 47 and an eighth connector 48 respectively located at an opposing rear end of the left frame bar 13 and an opposing rear end of the right frame bar 14, a third pivot member 53 pivotally connecting the fifth connector 45 to the seventh connector 47, and a fourth pivot member 54 pivotally connecting the sixth connector 46 to the eighth connector 48. Further, the fifth connector 45 comprises a stop flange 451. The sixth connector 46 comprises a stop flange 461. The seventh connector 47 comprises an abutment flange 471 for abutment against the stop flange 451 of the fifth connector 45 to limit the pivoting angle of the left frame bar 13. The eighth connector 48 comprises an abutment flange 481 for abutment against the stop flange 461 of the sixth connector 46 to limit the pivoting angle of the right frame bar 14.

Thus, when collapsing the bottom frame 1, unfasten the fastening means such as double-ended spring plunger 61, lock pin 62, or screw 63, screw nut 64 and washer 65 set to unlock the inner frame tube 111 and outer frame tube 112 of the front frame bar 11, and then push the inner frame tube 111 into the inside of the outer frame tube 112 to shorten the length of the front frame bar 11. At this time, the fifth connector 45 at the outer frame tube 112 and the sixth connector 46 at the inner frame tube 111 are driven to move the seventh connector 47 and the eighth connector 48 respectively, biasing the left and right frame bars 13,14 inwardly toward each other relative to the rear frame bar 12, and thus, the overall dimension of the bottom frame 1 is reduced, facilitating package, delivery or storage. Thus, simply unfastening the fastening means at the front frame bar 11 can collapse the bottom frame 1. When wishing to extend out the bottom frame 1, pull the inner frame tube 111 of the front frame bar 11 out of the outer frame tube 112 and fasten up the fastening means to lock the front frame bar 11 in the extended position. When pulling the inner frame tube 111 of the front frame bar 11 out of the outer frame tube 112, the fifth and sixth connectors 45,46 are driven to move the seventh and eighth connectors 47,48 respectively, thereby forcing the left and right frame bars 13,14 to bias outwardly away from each other relative to the rear frame bar 12 to the extent where the abutment flanges 431,441 of the third and fourth connectors 43,44 are respectively abutted against the stop flanges 411,412 of the first and second connectors 41,42 and, the abutment flanges 471,481 of the seventh and eighth connectors 47,48 are respectively abutted against the stop flanges 451,461 of the fifth and sixth connectors 45,46. At this time, fasten up the fastening means such as double-ended spring plunger 61, lock pin 62, or screw 63, screw nut 64 and washer 65 set to lock the inner frame tube 111 and outer frame tube 112 of the front frame bar 11 in the extended position. Thus, the bottom frame 1 is positively locked in the extended position.

Further, the two upright support frame bars 2 can be foldable; the top transverse frame bar 3 can be fastened to the upright support frame bars 2 in a detachable manner/ The prior art U.S. Pat. No. 7,341,265 and U.S. Pat. No. 8,444,173 that were invented by the present inventor teach the use of foldable upright support frame bars and a detachable mounting arrange of a top transverse frame bar.

In conclusion, the bottom frame 1 of the present invention is collapsible to reduce the dimension, facilitating package, delivery and storage. Further, setting the bottom frame 1 between the extended position and the received position can be achieved simply by fastening or unfastening the fastening means between the inner frame tube 121,111 and outer frame tube 122,112 of the rear frame bar 12 or front frame bar 11 rapidly with less effort.

What is claimed is:

1. A frame structure of baby trailer, comprising:

a bottom frame comprising a front frame bar, a rear frame bar opposite to said front frame bar, and opposing left and right frame bars respectively connected between said front frame bar and said rear frame bar;

two inverted u-shaped upright support frame bars respectively connected with respective front and rear ends thereof to said bottom frame; an a top transverse frame bar connected between said two upright support frame bars at a top side;

wherein said rear frame bar of said bottom frame is a retractable frame bar comprising an outer frame tube having a locating hole located at one end thereof, an inner frame tube slidably inserted with one end thereof into said outer frame tube and providing a locating hole, and fastening means detachably fastening the said locating hole of said outer frame tube to the said locating hole of said inner frame tube;

said bottom frame further comprises a first connector and a second connector respectively located at two opposite ends of said front frame bar, said first connector and a second connector each comprising a stop flange, a third connector and a fourth connector respectively located at a front end of said left frame bar and a front end of said right frame bar, a first pivot member pivotally connecting said first connector to said third connector, and a second pivot member pivotally connecting said second connector to said fourth connector, said third connector comprising an abutment flange for abutment against the said stop flange of said first connector to limit the pivoting angle of said left frame bar, said fourth connector comprising an abutment flange for abutment against the said stop flange of said second connector to limit the pivoting angle of said right frame bar, a fifth connector and a sixth connector respectively located at one end of said outer frame tube of said rear frame bar and an opposite end of said inner frame tube of said rear frame bar, a seventh connector and an eighth connector respectively located at an opposing rear end of said left frame bar and an opposing rear end of said right frame bar, a third pivot member pivotally connecting said fifth connector to said seventh connector and a fourth pivot member pivotally connect said sixth connector to said eighth connector, said fifth connector comprising a stop flange, said sixth connector comprising a stop flange, said seventh connector comprising an abutment flange for abutment against the said stop flange of said fifth connector to limit the pivoting angle of said left frame bar, said eighth connector comprising an abutment flange for abutment against the said stop flange of said sixth connector to limit the pivoting angle of said right frame bar.

2. A frame structure of baby trailer, comprising:

a bottom frame comprising a front frame bar, a rear frame bar opposite to said front frame bar, and opposing left and right frame bars respectively connected between said front frame bar and said rear frame bar;

two inverted u-shaped upright support frame bars respectively connected with respective front and rear ends thereof to said bottom frame; and a top transverse frame bar connected between said two upright support frame bars at a top side;

wherein said front frame bar of said bottom frame is a retractable frame bar comprising an outer frame tube having a locating hole located at one end thereof, an inner frame tube slidably inserted with one end thereof into said outer frame tube and providing a locating hole, and fastening means detachably fastening the said locating hole of said outer frame tube to the said locating hole of said inner frame tube;

said bottom frame further comprises a first connector and a second connector respectively located at two opposite ends of said front frame bar, said first connector and a second connector each comprising a stop flange, a third connector and a fourth connector respectively located at a front end of said left frame bar and a front end of said right frame bar, a first pivot member pivotally connecting said first connector to said third connector, and a second pivot member pivotally connecting said second connector to said fourth connector, said third connector comprising an abutment flange for abutment against the said stop flange of said first connector to limit the pivoting angle of said left frame bar, said fourth connector comprising an abutment flange for abutment against the said stop flange of said second connector to limit the pivoting angle of said right frame bar, a fifth connector and a sixth connector respectively located at one end of said outer frame tube of said front frame bar and an opposite end of said inner frame tube of said front frame bar, a seventh connector and an eighth connector respectively located at an opposing rear end of said left frame bar and an opposing rear end of said right frame bar, a third pivot member pivotally connecting said fifth connector to said seventh connector and a fourth pivot member pivotally connect said sixth connector to said eighth connector, said fifth connector comprising a stop flange, said sixth connector comprising a stop flange, said seventh connector comprising an abutment flange for abutment against the said stop flange of said fifth connector to limit the pivoting angle of said left frame bar, said eighth connector comprising an abutment flange for abutment against the said stop flange of said sixth connector to limit the pivoting angle of said right frame bar.

\* \* \* \* \*